United States Patent

[11] 3,532,024

| [72] | Inventor | Charles E. Gutshall<br>Roselle, Illinois |
|---|---|---|
| [21] | Appl. No. | 787,017 |
| [22] | Filed | Dec. 26, 1968 |
| [45] | Patented | Oct. 6, 1970 |
| [73] | Assignee | Illinois Tool Works Inc.<br>Chicago, Illinois<br>a corporation of Delaware |

[54] TOGGLE FASTENER
4 Claims, 8 Drawing Figs.

[52] U.S. Cl. .................................................. 85/71,
85/3, 85/80
[51] Int. Cl. ...................................... F16b 13/04
[50] Field of Search .......................................... 85/80, 63,
70, 71, 3, 3K, 3S; 151/41.75; 248/220.5

[56] References Cited
UNITED STATES PATENTS

| 1,370,319 | 3/1921 | Kennedy | 85/80 |
| 1,600,034 | 9/1926 | Brenizer | 85/3(S)UX |
| 3,170,361 | 2/1965 | Vaughn | 85/3 |
| 3,340,761 | 9/1967 | Fischer | 85/71 |

FOREIGN PATENTS

| 975,434 | 11/1964 | Great Britain | 85/80 |
| 1,210,351 | 9/1959 | France | 85/70 |
| 220,572 | 8/1967 | Sweden | 85/3(S)UX |

Primary Examiner—Marion Parsons, Jr.
Attorneys—Robert W. Beart, Michael Kovac, Barry L. Clark and Jack R. Halvorsen ABSTRACT: A toggle fastener having wing sections forming anchoring legs radiating from a central portion which is recessed to carry means with which a bolt cooperates to install the fastener; the wings and central portion are integrally formed of a suitable plastic material and the wings are transversely slotted to provide inner and outer sections joined to each other by an integral transverse hinge portion of reduced thickness; likewise, the inner sections of the wings are joined to the central portion by integral transverse hinge portions of reduced thickness; and a modification includes legs diverging axially from the central portion to mount the wing sections on the blind side of the supporting structure in self-sustaining position prior to assembly of a bolt therewith.

Patented Oct. 6, 1970
3,532,024
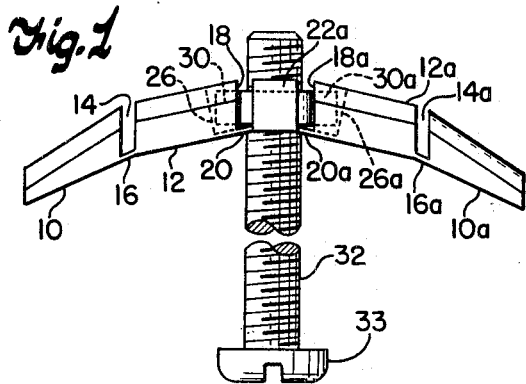
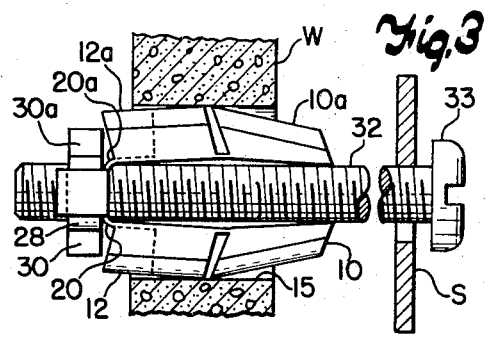
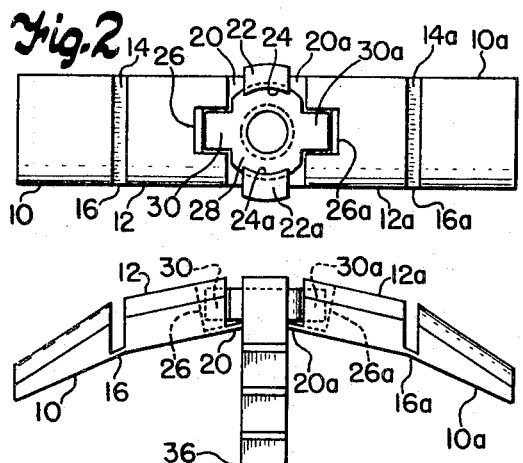
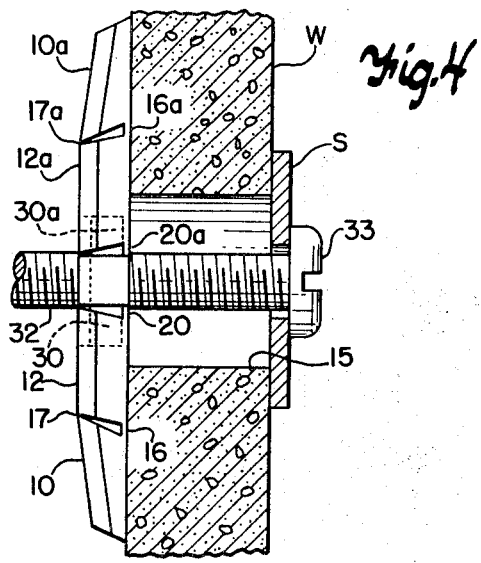
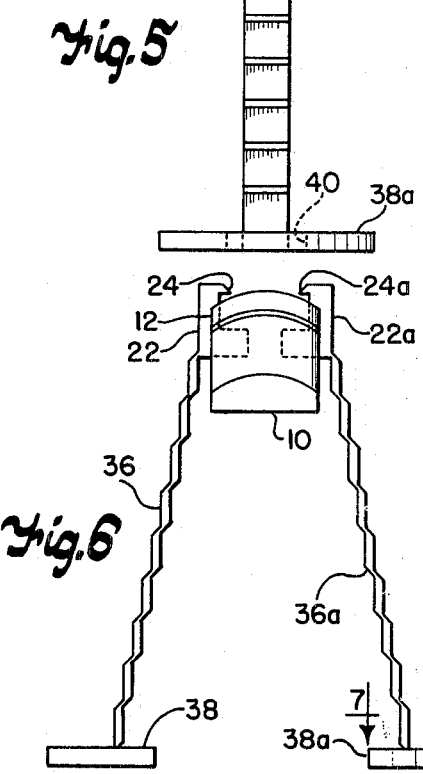
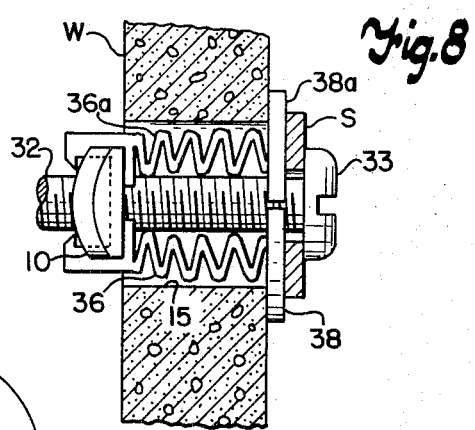
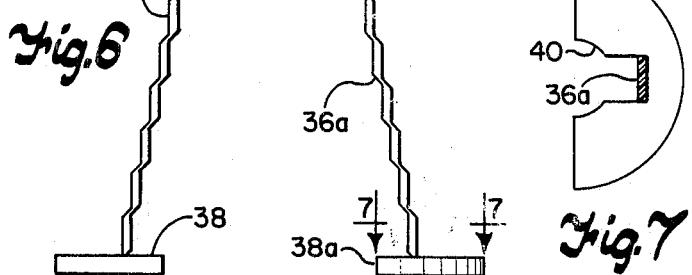
INVENTOR.
Charles E. Gutshall
BY
His Att'ys

TOGGLE FASTENER

The invention relates to improvements in a toggle fastener and to an improved anchoring unit with which a bolt cooperates to secure the fastener in its installed position.

An object of the invention is to provide an integral plastic anchoring unit including inner and outer wing sections resiliently hinged together for folding movement to collapsed position when passed through an opening in a wall or other support structure after which the sections return to normal retaining position on the blind side of the wall structure.

Another object of the invention is to provide the adjacent wing sections with transverse slots providing spaced wall surfaces which are brought into abutting contact for rigidifying the anchoring unit when the bolt is tightened home.

Another object of the invention is to provide an anchoring unit of the above type with a central recessed portion to receive a threaded nut, and hold the same against rotation.

A further object of the invention is to provide an anchoring unit of the above type including axially diverging legs which engage the wall aperture after the wing sections have been passed therethrough for temporarily supporting the unit prior to assembly of a bolt therewith.

A still further object of the invention is to provide an anchoring unit of the above type wherein the diverging legs are stepped for accordion folding within the wall aperture when the bolt is tightened to the installed position.

The above and other objects of the invention will in part be obvious and will be hereinafter more fully pointed out.

In the accompanying drawing:

FIG. 1 is a side elevation showing the wing sections assembled with a bolt to form the toggle fastener;

FIG. 2 is a top plan view of FIG. 1;

FIG. 3 is a side view showing collapse of the wings sections as they are passed through a wall aperture;

FIG. 4 is a similar side view but showing the wing sections straightened out in substantially rigid locking position under influence of the bolt;

FIG. 5 is a side elevation of a wing unit modified to include self-sustaining diverging legs;

FIG. 6 is a view similar to FIG. 5 but turned 90°;

FIG. 7 is a sectional view taken along the line 7-7 of FIG. 6; and

FIG. 8 is a view showing the modified wing unit in installed position.

Referring more in detail to FIGS. 1 and 2, the resilient wings are formed of a suitable plastic material such as linear polyethylene. The outer end sections 10, 10a are separated from the inner sections 12, 12a by transverse slots 14, 14a which, in turn, leave integral hinge portions 16, 16a of reduced thickness at the bottoms thereof. The inner ends of the inner sections 12, 12a have the wall portions 18, 18a, thereof spaced from one another a distance sufficient to leave integral bottom hinge portions 20, 20a of reduced thickness joining the sections 12, 12a, to the central portion. The central portion includes opposed upstanding arcuate post or wall sections 22, 22a which have inwardly extending and downwardly facing retainer lips 24, 24a. The inner end portions of the sections 12, 12a are recessed, as at 26, 26a, respectively, along a portion of the lengths thereof. The central portion of the fastener is thus adapted to receive an internally threaded nut member 28 which snaps beneath the lips 24, 24a and is held thereby when installed. It is to be noted that the nut 28 includes diametrically opposed projections 30, 30a which fit within the recesses 26, 26a, respectively, to hold the nut against rotation. The nut is adapted to receive the threaded shank 32 of a bolt having a suitable form of driving head 33.

As shown in FIG. 1, the wing sections form a gradual arc in normal position but when applied through an opening 15 in a wall structure W or the like, the sections 12, 12a will be abruptly hinged at the portions 20, 20a along with the end sections 10, 10a to approach or contact the surface of the bolt shank 32 when the combined fastener is forced through the opening 15 in the wall or other supporting structure. Prior to such assembly, there is usually assembled on the bolt shank a structural element S or the like to be attached to the wall W and covering the opening 15. When the fastener reaches a position clearing the free ends of the sections 10, 10a from the opening 15, the inherent resiliency of the hinge connections will spread the wing sections outwardly behind the blind surface of the wall structure W or the like. In so spreading, the projections 30, 30a on the nut will again be received in the recesses 26, 26a, respectively, of the sections 12, 12a. When the bolt is tightened with respect to the nut with the wing sections assuming the straightened out position of FIG. 4, it will be noted that the outer edges of the slots 14, 14a will come together and abut at 17, 17a, thus to provide rigidity to the wing sections in this installed position. Further, for the purposes of rigidity, the wall surfaces 18, 18a at the inner ends of the sections 12, 12a will abut the adjacent surfaces of the nut 28 and also, the ends of the nut projections 30, 30a will abut the adjacent edges of the recesses 26, 26a. The projections 30, 30a on the nut serve as further reinforcement to the wing sections across the area of the hinge sections over opening 15 in the wall structure W.

A modified form of a resilient wing unit is shown in FIGS. 5 through 8. The wing sections forming the radiating anchoring legs are the same as those described in connection with FIGS. 1 and 2. However, the upstanding supports or wall sections 22, 22a at the center of the wing sections are provided with integral diverging resilient legs 36, 36a which are stepped throughout the length thereof to provide a structure in the nature of accordion folds. These diverging legs terminate in semicircular foot portions 38, 38a which constitute essentially two halves of a washer. Thus, the inner edges of the foot sections are recessed as indicated by the numeral 40 on the foot portion 38a in FIG. 7. With this modified form of fastener unit, the wing sections can be passed through an opening in a wall structure without initially assembling the bolt therewith and with the diverging legs trailing. In such an installed position, the inherent resiliency of the diverging legs 36, 36a will engage the walls of the opening 15 and thus mount the wing sections of the fastener unit temporarily in self-sustaining position. Thereafter, the bolt is assembled to the nut and tightened to shift the parts to the installed position shown in FIG. 8. Thus, it will be seen that the stepped legs 36, 36a will at least partially collapse into accordion-like pleats within the opening 15 and the foot sections 38, 38a will have been drawn together in initial installation to at least form a partial seal across the wall opening 15 with the structural element S clamped thereagainst.

From the foregoing, it will be seen that the toggle fastener is one in which the anchoring legs are of integral plastic material with the wing sections separated by integral hinge portions permitting the wing sections to collapse for passage through the wall aperture and then spring back to the normally spread or radiating position on the blind side of the wall. When the bolt is tightened, the adjacent wall surfaces of the inner and outer sections abut one another at 17, 17a to result in a substantially rigid strut; and this rigidity is augmented by the abutment of the walls 18, 18a with the nut and the abutment of the ends of the nut projections 30, 30a with the adjacent surfaces of the recesses 26, 26a, respectively. With respect to the diverging legs 36, 36a of the modified unit, the self-sustaining temporary mounting has been explained. In addition, the bolt can be removed from such an assembly without losing the anchor unit on the blind side of the wall by reason of the washer sections 38, 38a and their connection with the anchor unit through the legs 36, 36a. Further, such a unit can be recovered reversely through the wall aperture by inserting a hook member to extend the legs and anchor unit to a position where each of the opposite wing sections may be separately hooked and positioned with their extremities within the wall aperture and then the unit removed therefrom.

I claim:

1. A one-piece plastic anchoring unit for use with a threaded bolt in a toggle fastener combination, and comprising a central portion apertured to threadedly receive the bolt, wings joined to said central portion by integral resilient hinge connections normally maintaining the wings in positions radiating from the central portion but permitting collapse thereof toward the axis of the central portion when passed through the aperture in a support structure to the blind side thereof, said wings further including traverse slots intermediate the ends thereof providing lower resilient hinge connections dividing the wings into inner and outer wing sections with the adjacent wall surface means in the region of said hinge connections to the central portion and the adjacent walls of the slots normally spaced apart but adapted to be brought into abutting relationship when the wings are stressed under bolt tightening influence to impart strut-like rigidity to the wings across the hinge connections when in bolt install position, said central portion being recessed to receive an internally threaded nut adapted to accept said bolt, said central portion including means to retain said nut in said recess in assembled relation, said nut including opposed projecting portions normally extending into recesses in adjacent wings and providing therewith additional abutment wall surface means when the unit is in bolt install position.

2. A one-piece plastic anchoring unit as claimed in claim 1 wherein the central portion is provided with legs extending generally normal to the wings at a rotated angular disposition relative thereto to trail the wings when passed through the work structure aperture and engage the wall of the aperture to mount the wings in self-sustaining position prior to bolt assembly therewith.

3. A one-piece plastic anchoring unit as claimed in claim 2 wherein the legs diverge slightly from one another and terminate in complemental washer sections to engage the accessible surface of the work structure.

4. A one-piece plastic anchoring unit as claimed in claim 3, wherein the legs are stepped in accordion-like form to collapse in accordion pleats within the work structure aperture when the unit is bolt installed.